(12) United States Patent
Seve et al.

(10) Patent No.: US 10,122,443 B2
(45) Date of Patent: Nov. 6, 2018

(54) METHOD FOR DETERMINING AN OPTICAL TRANSMISSION SYSTEM DESCRIPTION

(71) Applicant: Alcatel Lucent, Boulogne Billancourt (FR)

(72) Inventors: Emmanuel Seve, Nozay (FR); Petros Ramantanis, Nozay (FR); Jean-Christophe Antona, Nozay (FR); Sebastien Bigo, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/506,826

(22) PCT Filed: Sep. 29, 2015

(86) PCT No.: PCT/EP2015/072479
§ 371 (c)(1),
(2) Date: Feb. 27, 2017

(87) PCT Pub. No.: WO2016/050801
PCT Pub. Date: Apr. 7, 2016

(65) Prior Publication Data
US 2017/0244480 A1      Aug. 24, 2017

(30) Foreign Application Priority Data
Sep. 30, 2014   (EP) .................................... 14306542

(51) Int. Cl.
*H04B 10/079* (2013.01)
*H04B 10/27* (2013.01)
*H04B 10/2507* (2013.01)

(52) U.S. Cl.
CPC . *H04B 10/07951* (2013.01); *H04B 10/07953* (2013.01); *H04B 10/2507* (2013.01); *H04B 10/27* (2013.01)

(58) Field of Classification Search
CPC ........ H04B 10/07953; H04B 10/07951; H04B 10/2543; H04B 10/2525; H04B 10/2581; H04B 10/2563; H04B 10/2537
See application file for complete search history.

(56) References Cited

U.S. PATENT DOCUMENTS

| | | | |
|---|---|---|---|
| 8,787,754 B1* | 7/2014 | Beckett | H04B 10/0793 398/147 |
| 2011/0058821 A1* | 3/2011 | Goto | H04B 10/0797 398/195 |
| 2017/0244481 A1* | 8/2017 | Seve | H04B 10/07953 |

OTHER PUBLICATIONS

Antona, J.-C. et al; Design and Performance Prediction in Meshed Networks with Mixed Fiber Types; OFC/NFOEC 2008; 2008 Conference on Optical Fiber Communication/National Fiber Optic Engineers Conference; Feb. 1, 2008 pp. 1-3; XP055173989; DOI: 10.1109/OFC.2008.4528079.

(Continued)

*Primary Examiner* — Leslie C Pascal
(74) *Attorney, Agent, or Firm* — Patti & Malvone Law Group, LLC

(57) ABSTRACT

A technique is provided for determining an optical transmission system description. The technique includes determining a dispersion map of the optical transmission system, placing a set of discrete cumulative dispersions onto the dispersion map, and defining a plurality of sequential system segments of the optical transmission system. Each system segment has an input point that corresponds to a point in the optical transmission system where the input cumulative dispersion matches a cumulative dispersion of the set of discrete cumulative dispersions. For each system segment, an input power of the system segment and a local dispersion value of the system segment is determined. Also, for each system segment, a sequence number of the system segments is stored. Furthermore, for each system segment, the input power and the local dispersion value determined in relation (Continued)

with the input cumulative dispersion of the system segment in a data repository is stored.

5 Claims, 3 Drawing Sheets

(56)  References Cited

OTHER PUBLICATIONS

Seve, E. et al; Semi-Analytical Model for the Performance Estimation of 100Gb/s PDM-QPSK Optical Transmission Systems without Inline Dispersion Compensation and Mixed Fiber Types; 39th European Conference and Exhibition on Optical Communication (ECOC 2013); Jan. 1, 2013; pp. 720-722; XP055173994; DOI: 10.1049/cp.2013.1513; ISBN: 978-1-84-919759-5.

Antona, J.-C. et al; Physical design and performance estimation of heterogeneous optical transmission systems; Comptes Rendus—Physique, Elsevier, Paris, FR; vol. 9, No. 9-10; Nov. 1, 02008; pp. 963-984; XP026053393; ISSN: 1631-0705; DOI: 10.1015/J.CRHY.2008.11.002 [retrieved on Dec. 16, 2008].

Serena, P. et al; An Alternative Approach to the Gaussian Noise Model and its System Implications; Journal of Lightwave Technology, IEEE Service Center, New York, NY, US, vol. 31, No. 22; Nov. 1, 2013; pp. 3489-3499; XP011530745; ISSN: 0733-8724; DOI: 10.1109/JLT.2013.2284499 retrieved on Oct. 18, 2013].

\* cited by examiner

METHOD FOR DETERMINING AN OPTICAL TRANSMISSION SYSTEM DESCRIPTION

FIELD OF THE INVENTION

The invention relates to the technical field of optical communication systems, in particular methods and systems for producing a quality of transmission estimator for optical transmissions.

BACKGROUND

In optical networks, optical signals become weaker and distorted after having travelled through a significant distance. Indeed, optical signals are degraded while propagating in the optical medium due to physical effects. Physical degradations depend on a plurality of factors, such as the distance to propagate over, the characteristics of the optical links, the frequency occupation, etc.

Numerical methods as for example Split Step Fourier Method (SSFM) are able to perform propagation calculations. In E. Seve et al., "Semi-Analytical Model for the Performance Estimation of 100 Gb/s PDM Transmission Systems without Inline Dispersion Compensation and Mixed Fiber Types," Proc. ECOC, Th.1.D.2, London (2013), a semi-analytical model is described, that allows to determine the signal-to-nonlinear distortion ratio ($SNR_{NL}$), which is an indicator of the performance of the transmission. The disclosed model is especially suitable for optical links having long lengths, for example above 100 km.

SUMMARY

Aspects of the invention are based on the idea of expressing the nonlinear distortions of a complete transmission link as the sum of the nonlinear distortions generated independently by different sections of the optical link.

Aspects of the invention stem for the observation that signal distortions due to Kerr nonlinearities may be modeled as an additive Gaussian noise.

Aspects of the invention stem from the idea that chromatic dispersion is the main physical phenomenon impacting the generation of nonlinear noise.

Aspects of the invention stem from the idea that the variance of nonlinear noise produced after an elementary fiber section can be directly linked to the input cumulative dispersion and the fiber type of the section.

Aspects of the invention are based on the idea of reducing the computational costs of a quality of transmission estimation by storing in a memory a pre-calculated nonlinear distortion covariance matrix to be reused.

Aspects of the invention are based on the idea of proposing a fast estimation of the transmission performance in order to allow developing engineering rules for the transmission link optimization. This estimation is preferably to be faster than the estimation obtained by using the SSFM and/or other methods.

In accordance with a first object, the invention provides a method for producing a quality of transmission estimator for optical transmissions, the method comprising:
  defining a local dispersion value,
  defining a dispersion increment, for example over an elementary section length, having a sign identical to the local dispersion value,
  for each of a plurality of integer numbers, wherein the integer numbers range from 0 to an upper bound greater than or equal to 0, performing a propagation calculation by a propagation model and/or experiment, each propagation calculation and/or experiment dealing with the propagation of an optical signal along an elementary section, wherein the elementary section is a propagation medium characterized by the local dispersion value, an elementary section length corresponding to the dispersion increment, and wherein the optical signal which is incoming in the elementary section is previously affected by a cumulative dispersion value equal to the sum of a predefined pre-compensation dispersion and the integer number times the dispersion increment,
  for each elementary section, determining a variance of noise, the noise representing a distortion due to Kerr nonlinear field contributions in the elementary section,
  for each couple of elementary sections, determining a covariance of noise between the couple of elementary sections,
  storing in a data repository a look-up table comprising each determined variance of noise in association with the corresponding local dispersion value and cumulative dispersion value and each covariance of noise, in association with a first couple of local dispersion value and cumulative dispersion value and a second couple of local dispersion value and cumulative dispersion value.

In an embodiment, the method also comprises defining a pre-compensation dispersion as the minimum cumulative dispersion of the optical transmissions.

According to embodiments, such a method can comprise one or more of the features below.

There are many sorts of propagation models that may be employed. In a preferred embodiment, the propagation model is SSFM. In an embodiment the propagation model is a semi-empirical model. In an embodiment the propagation model is an analytical model.

There are many parameters that may be employed as input data for the propagation calculation of the optical signals, which are referred to as optical path parameters in the present specification. The propagation model takes into account the local dispersion value and the cumulative dispersion value along the optical path. In addition optical path parameters may be selected in the list below: parameters of the network topology, parameters of the source node and the destination node, number of nodes along the optical path, node positions, transponder types, fiber length, optical path length, fiber type, fiber modes, fiber refractive index, frequency occupation of the fibers, dispersion management, modulation format, channel spacing and others.

Some intrinsic features of the optical signal may also be taken into account as optical path properties for the propagation calculation: multiplexing type, carrier frequency, modulation format and others. In addition the propagation model takes into account the amplitude or power of optical signals.

Features of light emitting devices may also be taken into account as optical path properties for the propagation calculation and may be selected in the list below: chirp, emitting modes, emitting frequency, emitting spectral bandwidth, jitter and others.

Features of detectors may also be taken into account as optical path properties for the propagation calculation and may be selected in the list below: sensitivity, photodetection noise, shot noise, thermal noise, noise intrinsic to avalanche photodiodes and others.

In embodiments, the noise may represent a distortion further due to any nonlinear field contribution and/or association of nonlinear field contributions from the following list: second harmonic generation, frequency mixing, optical parametric amplification and oscillation, spontaneous parametric down conversion, sources of entangled photons based on SPDC, four-wave mixing, Raman scattering, spontaneous and stimulated Raman scattering, Raman amplification, Brillouin Scattering and two photons absorption.

In an embodiment, the method further comprises a non-dimensionalizing step comprising:
- for each elementary section, determining an input power that was employed in the propagation model or experiment,
- for each variance determined for an elementary section in the determining step, dividing the variance by the input power employed for the elementary section to the square,
- for each covariance determined for a couple of elementary sections in the determining step, dividing the covariance by the input power determined for the first elementary section of the couple and the input power determined for the second elementary section of the couple.

In an embodiment, the method further comprises, for each elementary section, determining the signal power at a receiver side, and determining a normalized signal, equal to the received signal divided by the square root of the signal power at the receiver side, the variance being calculated over the normalized signal.

In an embodiment, the local dispersion value corresponds to an optical fiber.

In an embodiment, the optical fiber has a type selected in the following list: Single Mode Fiber, Dispersion Compensation Fiber, LEAF, multi-fiber, multicore fiber, multi-mode fiber, polarization-maintaining fiber, photonic-crystal fiber, multimode graded index optical fiber, Non-Zero Dispersion Shifted Fiber, True-Wave-Reduced Slope, True-Wave-Classic, Teralight and SMF-LS.

In an embodiment, the look-up table comprises a covariance matrix of the noise due to Kerr nonlinear field contributions generated in the elementary sections.

In an embodiment, the dispersion increment corresponds to a dispersion cumulated by an optical signal propagating along a section of an optical link which length is comprised between 100 m and 20 km. The lower the dispersion increment, the more accurate the estimation of quality of transmission is. The higher the dispersion increment, the cheaper the calculation is. Thanks to these features, it is possible to implement a quality of transmission estimator able to predict the performance of an optical network system; especially with short fiber length and/or fiber type heterogeneity and/or different types of dispersion management and/or different amplification schemes.

The invention also provides a quality of transmission estimator device for optical transmissions, the device comprising:
- a data repository in which is stored a look-up table, comprising a plurality of variances entries $\sigma_{nn}$, each variance entry being stored in association with a corresponding local dispersion value and a corresponding cumulative dispersion value, the cumulative dispersion value being chosen in a set of cumulative dispersion values consisting of the sum of a predefined pre-compensation dispersion and a predefined dispersion increment multiplied by an integer number ranging from 0 to an upper bound greater than or equal to 0, the look-up table further comprising a plurality of covariance entries, each covariance entry being stored in association with a first couple of local dispersion value and cumulative dispersion value and a second couple of local dispersion value and cumulative dispersion value,
- an input interface for receiving an optical transmission system description, the system description defining a plurality of system segments $S_k$ and, for each system segment $S_k$, an input power $P_k$ of the system segment, a local dispersion value of the system segment and an input cumulative dispersion of the system segment,
- a calculation unit (114) configured to perform:
  - for each system segment $S_k$, selecting a variance entry $\sigma_{match(k)match(k)}$ in the look-up table, so that the local dispersion and input cumulative dispersion of the system segment $S_k$ substantially match the local dispersion value and cumulative dispersion value associated with the variance entry $\sigma_{match(k)match(k)}$,
  - for each couple of this system segments $S_k$ and $S_{k'}$, selecting a covariance entry $\sigma_{match(k)match(k')}$ in the look-up table, so that the local dispersion and input cumulative dispersion of the system segment $S_k$ substantially match the first couple associated with the covariance entry and so that the local dispersion and input cumulative dispersion of the system segment $S_{k'}$ substantially match the second couple associated with the covariance entry
  - calculating a quality of transmission estimate $$SNR_{NL}^{-1} = \sum_{k=1}^{N} P_k^2 \sigma_{match(l)match(k)} + 2 \sum_{k=1}^{N} \sum_{k'=1}^{k-1} P_k P_{k'} \text{Re}[\sigma_{match(l)match(k')}]$$

where N is the number of system segments in the optical transmission system description
- an output interface for transmitting the calculated quality of transmission estimate.

Aspects of the invention are based on the idea of computing a real-time estimation, for example in a few seconds or less, of the transmission performance to determine the number and the positions of optical regenerators where needed, and/or to determine an alternative path in a network in the case of an unexpected link failure and/or to determine the shortest path to satisfy a demand in a network and/or to determine a new path in case of application-driven reconfigured networks in a Software Defined Network frame.

In an embodiment, the look-up table comprises a covariance matrix.

The optical signals may be multiplexed in accordance with any multiplexing method, e.g. WDM-multiplexed and/or spatially-multiplexed and/or polarization-multiplexed.

The output interface may be implemented in diverse manners. In an embodiment, the output interface provides a user with the quality of transmission estimator for optical transmissions in a suitable format for the use in a network design, e.g. as a computer file or a paper printout.

In accordance with a second object, the invention also provides a method for determining an optical transmission system description, the method comprising the steps of:
- determining a dispersion map of the optical transmission system,
- placing a set of discrete cumulative dispersions, onto the dispersion map,
- defining a plurality of sequential system segments $S_k$ of the optical transmission system, wherein each system segment has an input point that corresponds to a point in the optical transmission system where the input cumulative dispersion matches a cumulative dispersion of the set of discrete cumulative dispersions, for each system segment $S_{k'}$ determining an input power $P_k$ of the system segment, and a local dispersion value of the system segment, for each system segment $S_{k'}$ storing a sequence number of the system segments $S_{k'}$ storing the input power and the local dispersion value determined in relation with the input cumulative dispersion of the system segment $S_k$ in a data repository.

Thanks to these features, it is possible to obtain a concise description of the optical system which nevertheless contains sufficient information to obtain the quality of transmission of the optical system.

Thanks to these features, it is possible to get a representation format applicable to any kind of optical system, which provides a large use of a quality of transmission estimator device. For example, performing the above method on each connection between two consecutive nodes in an optical network makes it possible to use the transmission estimator device for each of these connections and therefore anticipate the quality of transmission of any connection within the optical network.

Thanks to these features, it is possible to use a quality of transmission estimator device for estimating the quality of the optical transmission system in a very fast and efficient manner.

Thanks to these features, it is possible to obtain a compact representation of any optical system in order to use it in a quality of transmission estimator.

According to embodiments, such a method can comprise one or more of the features below.

In an embodiment, the discrete cumulative dispersions of the set are separated by a fixed cumulative dispersion increment.

In an embodiment, the method further comprises: determining an upper bound and a lower bound of the dispersion map and selecting the set of discrete cumulative dispersions to make it cover more than 95% of the range between the upper bound and the lower bound.

In an embodiment, the set of discrete cumulative dispersions is comprised in a range of cumulative dispersion between $-10^{-4}$ ps/nm and $10^4$ ps/nm.

The invention also provides a use of an optical transmission description obtained with the method of claim 1 for determining a quality of transmission estimate for the optical system, the use comprising:

providing a look-up table ($\Sigma_1$) comprising a plurality of variance entries $\sigma_{nn}$, each variance entry being stored in association with a corresponding local dispersion value and a corresponding cumulative dispersion value ($D_1$ to $D_6$), the cumulative dispersion value being chosen in a set of cumulative dispersion values consisting of the sum of a predefined pre-compensation dispersion and a predefined dispersion increment (14) multiplied by an integer number ranging from 0 to an upper bound greater than or equal to 0, the look-up table ($\Sigma_1$) further comprising a plurality of covariance entries, each covariance entry being stored in association with a first couple of local dispersion value and cumulative dispersion value and a second couple of local dispersion value and cumulative dispersion value, for each system segment $S_k$ of the optical transmission system, selecting a variance entry $\sigma_{match(k)match(k)}$ in the look-up table, so that the local dispersion and input cumulative dispersion of the system segment $S_k$ substantially match the local dispersion value and cumulative dispersion value associated with the variance entry $\sigma_{match(k)match(k)}$, for each couple of the system segments $S_k$ and $S_{k'}$ selecting a covariance entry $\sigma_{match(k)match(k')}$ in the look-up table, so that the local dispersion and input cumulative dispersion of the system segment $S_k$ substantially match the first couple associated with the covariance entry and so that the local dispersion and input cumulative dispersion of the system segment $S_{k'}$ substantially match the second couple associated with the covariance entry calculating the quality of transmission estimate as:

$$SNR_{NL}^{-1} = \sum_{k=1}^{N} P_k^2 \sigma_{match(l)match(k)} + 2\sum_{k=1}^{N}\sum_{k'=1}^{k-1} P_k P_{k'} \operatorname{Re}[\sigma_{match(l)match(k')}]$$

where N is the number of system segments in the optical transmission system description.

The invention also provides an information signal comprising modulated data, wherein modulated data represent a sequential system segments $S_k$ of an optical transmission system, wherein each system segment has an input point that corresponds to a point in an optical transmission system where an input cumulative dispersion substantially matches an cumulative dispersion of a set of discrete cumulative dispersions, wherein each system segment $S_k$ has an input power $P_k$ value, a local dispersion value and a sequence number.

Aspects of the invention are based on the idea of describing an optical system in a compact format which essentially employ dispersion information.

Aspects of the invention stem for the observation that information of dispersion can be sufficient to get a precise estimation of the quality of transmission of an optical system.

Aspects of the invention are based on the idea of characterizing a network by elementary fiber sections in terms of fiber type and cumulated dispersion at the section input.

Aspects of the invention are based on the idea of modeling connections in a complete network by using elementary fiber sections for which coefficients have been pre-calculated in order to easily evaluate the feasibility of the connections in a fast manner and with a very good accuracy.

Aspects of the invention are based on the idea of describing each fiber of a meshed network as a concatenation of small fiber sections and find a minimal set of data for describing the complete network by removing all redundant fiber sections having the same characteristics of fiber type and input cumulated dispersion.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

In an illustrative example, a WDM optical network carries 100 Gb/s per wavelength on uncompensated optical links, i.e. without inline dispersion compensation between the optical fiber spans comprised in the optical links. The network must carry a plurality of 100 Gb/s demands, the 100 Gb/s payload being transported over Polarization Division Multiplexed Quaternary Phase Shift Keying PDM-QPSK wavelengths.

It is well known that for such systems, the mains sources of impairments are the Amplified Spontaneous Emission (ASE) noise and the distortions due to the Kerr Effect. Both effects can be modeled extremely accurately by additive white Gaussian noise. The total signal-to-noise ratio at the receiver is defined by:

$$SNR^{-1} = \frac{P_{ASE} + P_{NL}}{P}$$

and the nonlinear-distorsion-to-signal-ratio is defined by $$SNR_{NL}^{-1} = \frac{P_{NL}}{P},$$

where P is the power of the signal, $P_{ASE}$ the power of the amplified spontaneous emission (ASE) noise measured in a reference bandwidth (e.g. 0.1 nm as for the traditional definition of optical SNR (OSNR)) and $P_{NL}$ the power of nonlinear distortions.

$P_{ASE}$ depends on the distance traveled by the signal and specifically on the number of traversed optical amplifiers and their characteristics.

$P_{NL}$ depends also on the distance traveled by the signal, therefore of the length of the optical link, on the nature of the optical link, therefore of the local dispersion value, and on the optical power of the signal under consideration.

To estimate the quality of transmission of an optical link, the fiber types comprised in the optical link are to be taken into account. In an optical network, different fiber types may be used having a plurality of different local dispersion values. For example, a Single Mode Fiber (SMF) has a local dispersion value of 17 ps/nm/km. By contrast, a Dispersion Compensation Fiber (DCF) has a negative local dispersion value.

Figure 7:
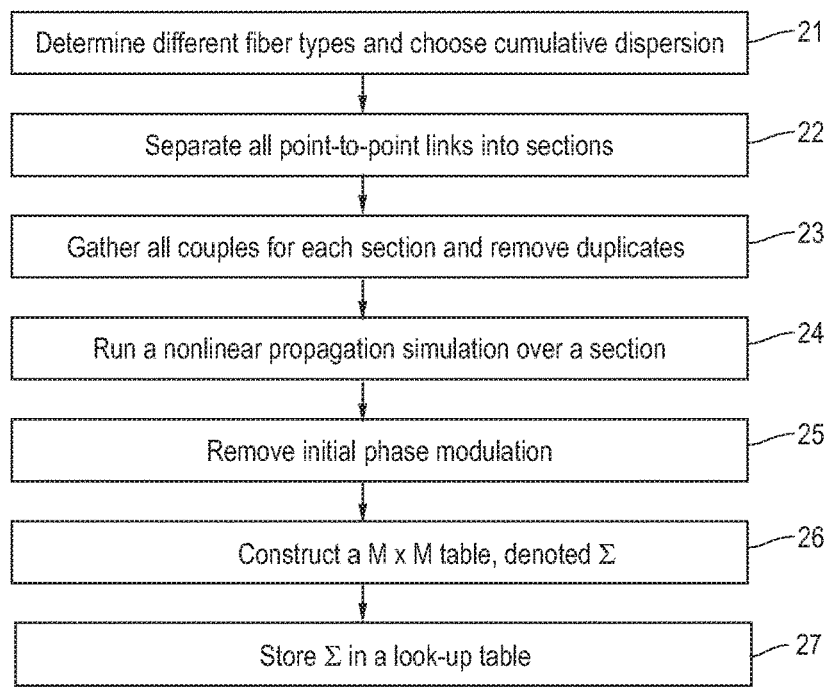
FIG. 7 is a flow chart showing a method that carries out the calculation of the fast estimation of the quality of transmission of an optical signal along an optical link.

Method for Producing a Quality of Transmission Estimator for Optical Transmissions:

With reference to FIG. 7, a numerical method for producing a quality of transmission estimator for optical transmissions will now be explained.

The method yields the nonlinear distortion variance of all possible connections in a meshed network, for an arbitrary modulation format, dispersion management and possibly heterogeneity of fiber types and fiber lengths. The resulting nonlinear distortion variance is stored in a memory and is a main component of the quality of transmission estimator.

The method comprises the performing of the following steps:

As a preamble, determining a chromatic dispersion map of the transmission system, i.e. predicting the cumulated chromatic dispersion at each and every point in the optical transmissions. The dispersion map is employed for sampling the optical transmissions into sections denoted $S_k$. A cumulative dispersion value, denoted $D_k$ for a section $S_k$ of the network is a pre-dispersion previously cumulated by the optical signal while propagating along the fiber and measured at an input point of the section $S_k$, where k is an integer number.

In a step 21, the method performs: determining the different fiber types present in an optical network $F^{(l)}$, with l=1, 2, ..., m for m different fiber types and choosing a fixed increment of cumulative dispersion $\Delta D^{(l)}$, for each one of the different fiber types $F^{(l)}$, with l=1, 2, ..., m.

In step 22, considering all possible point-to-point links in a network and separating them into sections $S_k$, with the fiber type of the section denoted $F_k$ and the corresponding dispersion increment $\Delta D_k$ which is cumulated during the propagation of an optical signal along a section k, where $F_k$ and $\Delta D_k$ are chosen among the possible fixed values $F^{(l)}$ and the corresponding $\Delta D^{(l)}$ of the step 21.

In step 23, the method performs the gathering all couples $(D_k, F_k)$ corresponding to each section $S_k$ of the network and the removing of the duplicates from the gathering. This step 23 leads to a total of M distinct couples $(D_k, F_k)$.

In step 24, that is a calibration step, the method performs, for each couple $(D_k, F_k)$, running a SSFM nonlinear propagation simulation over a section $S_k$. The series of M simulations is referred to as the calibration phase step 24. As the M simulations are completely independent, they can all be run in parallel, thus speeding up the calibration step 24 of the network.

In an illustrative case of an optical signal propagating in the sections with a QPSK modulation, the following step 25 is performed for each of the output signals resulting from the M simulations of the calibration phase step 24. Step 25 comprises: the removing of the initial phase modulation, the compensation of the nonlinear phase shift and the removing of the input signal coming from a filtering at the transmitter side, if any. Indeed, as shown on FIG. 9, a filter 94 is optionally placed between the transmitter 95 and the fiber 91. The removing of the input signal from the output signals resulting from the M simulations allows extracting M nonlinear distortion fields of the optical signal propagating in the sections. The removing is performed on both the input and output signals sampled at the middle of each symbol time.

In step 26, the method further comprises:
Constructing a M×M table, denoted E in the following. Table $\Sigma$ comprises the calculation of the variance $\sigma_{ii}$ and covariance $\sigma_{ij}$ of the nonlinear distortion fields of the optical signal propagating in the sections i and j, i and j denoting the values taken by k, for each distinct couple $D_k, F_k$.

In step 27, the method performs the storing of E in a look-up table in an external memory for future usage.

The dispersion increment $\Delta D^{(l)}$ for each fiber type is calculated as follows: $\Delta D^{(l)} = \int DF^{(l)}(z)dz$, wherein $DF^{(l)}$ denotes the local dispersion for the fiber type $F^{(l)}$ and wherein the integration is performed over the section of length dz.

The choice of the dispersion increment has an incidence on the section length of the section considered. Indeed, for a fiber section k having a fixed local dispersion value $DF_k$, the higher the length, the higher the cumulative dispersion value $D_k$ is. Therefore, the choice of the dispersion increment for each fiber type $\Delta D^{(l)}$ depends on the available system memory, the desired accuracy and the variety of span lengths existing in the network to be estimated. Short sections yield a higher accuracy but they demand both a large amount of memory and a higher calculation time.

Figure 9:
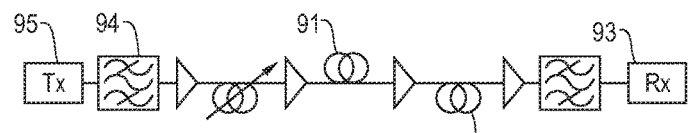
FIG. 9 is a functional drawing of an example of optical link from a transmitter to a receiver.

For the sake of illustration, in the above method, the SSFM nonlinear propagation simulation is performed on a bit sequence with quasi-random distribution of ones and zeros. With reference to FIG. 9, an example of optical link is described. The optical link is a fiber 91. A SSFM simulation is performed for the fiber 91. As shown on FIG. 9, the dispersion is brought back to zero by a full post compensation fiber 92 before the optical signal arrives to the receiver 93.

Figure 1:
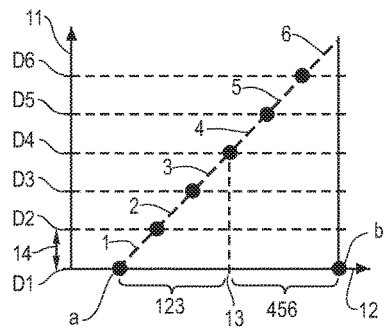
FIG. 1 is a schematic graph of cumulative dispersion values of an optical signal propagating over an optical link as a function of distance from the source node, the optical link comprising an optical fiber having no in-line dispersion compensation.
Figure 2:
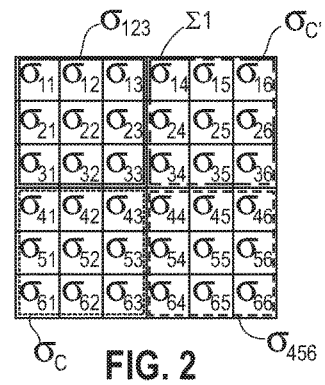
FIG. 2 is a look-up table comprising variances of a nonlinear noise of the optical signal propagating over the optical link of FIG. 1, the variances being in association with corresponding cumulative dispersion values estimated in FIG. 1, the look-up table further comprising covariances of the noise, in association with a cumulative dispersion value of different sections of the optical link.
Figure 3:
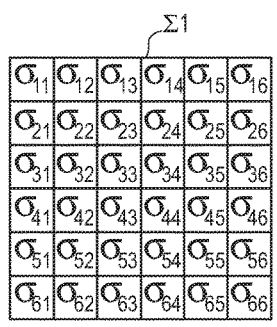
FIG. 3 is a covariance matrix of the nonlinear noise of the sections of the optical link of FIG. 1, the covariance matrix being identical to the look-up table of FIG. 2, the covariance matrix being constructed thanks to the look-up table of FIG. 2 by selecting the variances and covariances of the cumulative dispersion values corresponding to the successive sections of the optical link of FIG. 1.

For the sake of illustration, with reference to FIGS. 1 to 3, such a method is performed on an optical network that consists of a single optical link ab to produce a look-up table. The look-up table is useful to estimate the quality of transmission of an optical link cd as it will later be explained with reference to FIGS. 4 to 6. FIG. 1 is a schematic graph of cumulative dispersion values $D_1, D_2, D_3, D_4, D_5$ and $D_6$ of an optical signal propagating over the optical link ab, as a function of the sections 1 to 6 of the optical link ab. For example, $D_1$, is a negative dispersion value equal to the value of the pre-compensation at the input of the optical link ab. The optical link ab comprises two spans 123 and 456, characterized by the same fiber type, i.e. the local dispersion value along the two spans is the same. The local dispersion value $F_k$ for each section k, with k=1 to 6, is the same. The spans 123 and 456 are respectively split into 3 sections 1, 2, 3 and 4, 5, 6. The sectioning of the spans 123 and 456 is performed as follows: for each section 1, 2, 3, 4, 5 and 6 of the optical link ab, the cumulative dispersion value represented on the axis 11 increases by a same increment of dispersion 14. The sections of the optical link ab incorporate no in-line dispersion compensation. Therefore the cumulative dispersion of each section $S_k$ denoted $D_k$ is equal to $\Sigma_i D_i$. For each section $S_k$ having a distinct couple $(D_k, F_k)$, the method performs the running of a SSFM simulation, as a function of the couple comprising the cumulative dispersion and the local dispersion $D_k, F_k$ characterizing the section $S_k$ of the optical link ab. $P_0$ denotes a fixed power value at the input of each section $S_k$ employed in the SSFM simulations.

Denoting $u_{NL,k}$ the nonlinear distortion field of the optical signal at the output of the section $S_k$ calculated by the SSFM simulation, each coefficient $\sigma_{ij}$ of the matrix $\Sigma_1$ represented on FIG. 2 is then calculated as follows:

$$\sigma_{ij} = \text{cov}(u_{NL,i}, u_{NL,j})/P_0^2$$

with $\text{cov}(X,Y) = E[(X-\mu_X)^2(Y^*-\mu_Y^+)^2]$ being the covariance of the random variables X and Y with averages $\mu_X$ and $\mu_Y$ and E[.] the expected value. The matrix $\Sigma_1$ is then stored in a data repository for future usage.

Indeed, with the matrix $\Sigma_1$ the transmission performance of the optical link ab may be calculated by a quality of transmission estimator device comprising the data repository, by selecting the variances and covariances $\sigma_{ij}$ of $\Sigma_1$ corresponding to the couple $D_k, F_k$ characterizing the sections $S_k$ of the optical link ab, with k=1, . . . 6.

The optical system described with reference to FIG. 1 does not necessary really exist. FIG. 1 is described uniquely in order to illustrate the method of calculation of the coefficients of a quality of transmission which allows estimating a large number of optical systems. Similarly, the coefficients may be calculated for a large number of local dispersion values in order to produce an estimator capable of calculating the coefficients for a large number of optical fiber types. In special cases, the coefficients of one fiber type l' may be deduced by the already calculated coefficients of the fiber type l, by replacing the fiber type $F^{(l)}$ by $F^{(l')}$ the cumulative dispersion $D^{(l')}$ by the cumulative dispersion $$\frac{DF^{(l')}}{DF^{(l)}} D^{(l)}$$

and finally the coefficient $\sigma_{ij}$ by the coefficient $$\frac{DF^{(l')}}{DF^{(l)}} \sigma_{ij}.$$

In an embodiment, the dispersion increment $\Delta D^{(l)}$ for each fiber type is defined to be the same and is denoted $\Delta D$. Therefore, the length of the sections of different fiber types varies and is denoted $dz^{(l)}$.

Since the covariance matrices constructed thanks to the method above described have a Hermitian symmetry, only M*(M+1)/2 terms are to be calculated. This determines the memory usage of the method. Considering for example, 400 sections and assuming that the variance and covariance terms are stored with a double float accuracy, i.e. 8 bytes, the memory takes up 8*400*(400+1)/2=641.6 Kbytes.

The complexity of the method is upper-bound by N×(N+1)/2 additions, where N×N is the size of the sub-matrix D corresponding to the point-to-point optical link of interest with N<M.

The method described above allows a fast computation of the transmission performance of all links in a network simultaneously. Indeed, as described in step 24, the number of simulations depends on the number of the distinct couples of fiber type $F_k$ and cumulative dispersion $D_k$ of the sections $S_k$ appearing in the network.

An advantage of the method is to be able to construct a look-up table comprising the variances and covariances of the nonlinear noises generated by all possible combinations of fiber types and input cumulative dispersions for a given modulation format, that may be used to calculate the performance of any possible optical link. The overall calculation time and cost gain compared to existing methods can be found by dividing the total number of sections in a network by the number of the discrete couples found in step 24.

In an embodiment, a SSFM simulation of the method is performed for a WDM optical signal, with the assumption that each optical channel of the bandwidth is occupied. The assumption leads to over-estimate the transmission degradation.

The method described above is a numerical method. However, it may also be implemented as an experimental method according to the same steps.

Above we have described the method for producing the quality of transmission estimator. Now, the exploitation of the quality of transmission estimator will be described.

Figure 4:
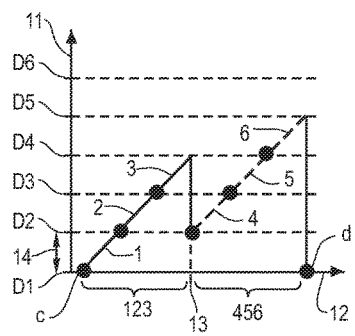
FIG. 4 is a schematic graph of the cumulative dispersion of an optical signal propagating over an optical link as a function of distance from the source node, for an optical link with a dispersion compensation device being half-way between the source and the destination nodes situated at both ends of the optical link.
Figure 5:
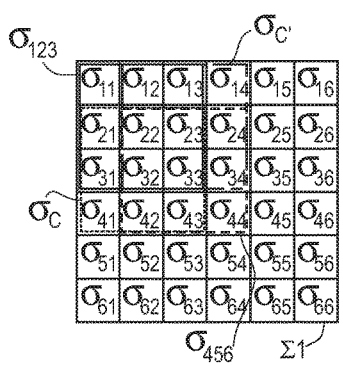
FIG. 5 is the look-up table of FIG. 2, showing the selection of the variances and covariances of the cumulative dispersion values corresponding to the sections of the optical link of FIG. 4.

In order to exploit the quality of transmission estimator to estimate the quality of transmission of any optical system, for example the optical system of FIG. 4, a first step is necessary. The first step consists in providing a suitable description of the optical system to be estimated.

Figure 11:
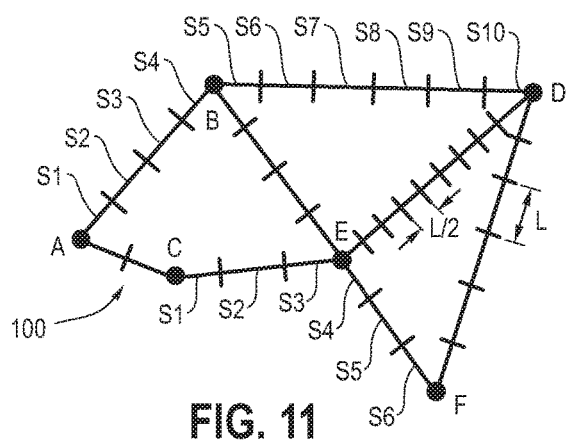
FIG. 11 is a schematic of a 6-nodes network having optical fibers of two types.

A Method for Determining an Optical Transmission System Description:

Providing a suitable description of the optical system to be estimated is achieved by the following method, which will be illustrated with reference to FIG. 11. The optical transmission system is a point-to-point optical transmission in an optical network. For example, the optical transmission system is defined as a connection between two nodes of the network. Any possible connections between any nodes of an optical network may be described thanks to the following method.

The method for determining the optical transmission system description comprises a few steps.

In a first step, the method performs determining a dispersion map of the optical transmission system. A dispersion map plots the cumulative dispersion as a function of transmission distance along an optical communication path. The dispersion compensation devices at the input and/or output ends of optical fibers, if any, may produce abrupt changes in cumulative dispersion along the optical transmission system. To construct the dispersion map, the cumulative dispersion value D may be calculated as follows: $D(z)=\int DF(z)dz$, where DF denotes the local dispersion value and z denotes the distance through which the optical signal has propagated. A suitable computer program may be employed to establish the dispersion map of any optical transmission system or at least substantially match those values. This step generally assumes that local dispersion is known in all links of the system.

In a second step, the method performs placing a set of discrete cumulative dispersions onto the dispersion map. The set of discrete cumulative dispersions should be comprised in the cumulative dispersion values employed in the method for producing the quality of transmission estimator. Preferably, two consecutive discrete cumulative dispersions of the set are separated by a dispersion increment $\Delta D$ defined as the smallest dispersion increment of the set of dispersion increments $\Delta D^{(l)}$ defined for each fiber type in the method for producing the quality of transmission estimator, or an integer multiple of that increment $\Delta D$.

As an illustration, referring to the optical system of FIG. 4, the set of cumulative dispersion values is represented by $D_1$, $D_2$, $D_3$, $D_4$, $D_5$ and $D_6$.

In a third step, the method performs defining a plurality of sequential system segments $S_k$ of the optical transmission system, wherein each system segment has an input point that corresponds to a point in the optical transmission system where the input cumulative dispersion matches an input cumulative dispersion of the set.

In a fourth step, the method performs, for each system segment $S_k$, determining an input power $P_k$ of the system segment, and if necessary a local dispersion value of the system segment, In a last step the method comprises, for each system segment $S_k$, storing the input power and the local dispersion value determined in relation with the input cumulative dispersion of the system segment $S_k$ in a data repository.

A sequence number of the system segments $S_k$ is also stored. The sequence number defines the ordering of the system segments in a point-to-point optical system. It may be represented by an integer number. In order to describe a meshed network, the system may be represented as a combination of point-to-point links.

For the sake of illustration, a simplified network will be described with reference to FIG. 11. FIG. 11 is a schematic of an optical network 100 comprising six nodes denoted by A to D. The optical fibers linking the nodes A and B, B and E, B and D, D and F, A and C, C and E and E and F have the same local dispersion value, which is equal to half the local dispersion value of the optical fiber linking the nodes E and D. No in-line dispersion compensation is performed along the optical fibers of the network 100 and no dispersion compensation device is provided in the optical nodes. The optical connections established are transparent.

The method for determining an optical transmission system description thus performs the third step over each link of the optical network 100.

Each optical fiber of the network is segmented into system segment $S_k$ in order that each system segment $S_k$ has an input cumulative value of the set of discrete cumulative dispersions.

The local dispersion value of the optical fiber linking the nodes E and D is twice the local dispersion value of the other optical fibers of the network 100. As a result, the elementary length of the system segments between nodes E and D is equal to a value L/2 which is half the elementary length value L of the system segments of the other optical fibers of the network 100. In other words, in this particular example, the discretization of the optical system employs a uniform mesh-size in terms of cumulated dispersion, resulting in a non-uniform mesh-size in terms of distance.

An optical connection between nodes A and D will follow the shortest path A-B-D with a total length of 10 times the increment ΔD. An optical connection between nodes C and F, will follow the shortest path C-E-F with a total length of 6 times the length L.

For example, the optical paths A-B-D and C-E-F have no dispersion management and are of one single fiber type, i.e. one local dispersion value. Therefore, the sectioning of the optical paths A-B-D and C-E-F results in similar system segments $S_1$ to $S_6$ of same local dispersion and cumulated dispersion. Therefore the coefficients stored in the matrix corresponding to the cumulative dispersion values and local dispersion value of the system segments are usable twice for the estimation of the quality of transmission along the system segments $S_1$ to $S_6$.

Figure 12:
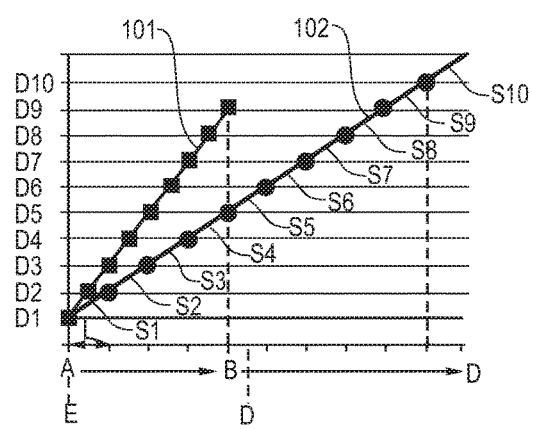
FIG. 12 shows the discretization of the dispersion map of two optical transmission paths of the 6-nodes network of FIG. 11.

With reference to FIG. 12, the dispersion map of the optical paths A-B-D and E-D is represented. The set of discrete cumulative dispersions placed onto the dispersion map has been shown on the vertical axis, represented by $D_1$, $D_2$, $D_3$, $D_4$, $D_5$, $D_6$, $D_7$, $D_8$, $D_9$ and $D_{10}$. The distance has been represented on the horizontal axis.

The squares represent the inputs of the system segments for the optical path E-D. The dots represent the inputs of the system segments $S_1$ to $S_{10}$ for the optical path A-B-D. The input cumulative dispersion at the input of the last system segment of the optical path A-B-D has a value $D_{10}$. The local dispersion value of the optical path E-D being twice the local dispersion value of the optical path A-B-D, the slope of the line 101 is twice the slope of the line 102.

Therefore the coefficients stored in the matrix corresponding to the cumulative dispersion values and local dispersion value of the system segments for the optical path E-D are not the same as the coefficients for the optical path A-B-D.

For realistic homogeneous networks, the length of each fiber is not necessary a multiple of the dispersion increment. Therefore, for realistic networks, the length of each optical fiber is rounded to the closest multiple of the dispersion increment ΔD. The method inaccuracy due to this fiber length approximation is negligible especially for low values of the dispersion increment.

Exploitation of the Quality of Transmission Estimator:

Thanks to the method for determining an optical transmission system description above described, any optical transmission may be described in a convenient format for the exploitation of the quality of transmission estimator obtained thanks to the method for producing a quality of transmission estimator.

Figure 8:
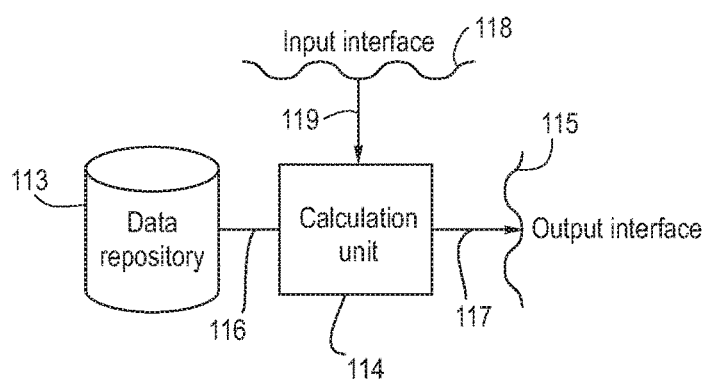
FIG. 8 is a functional drawing of a computing device that may be employed for computing the estimation of the quality of transmission of an optical signal along an optical link.

With reference to FIG. 8, such a quality of transmission estimator device for optical transmissions will now be described. The device comprises a data repository 113 and a calculation unit 114 that is linked to the data repository 113 as shown by line 116. The device further includes an output interface 115 that is linked to the calculation unit 114 as shown by arrow 117. In embodiments, the output interface may be connected to a data repository, a network interface, a printer and the like. The look-up table Σ constructed thanks to the above described method is stored in the data repository 113. The device also comprises an input interface 118 able to receive an optical transmission system description and to transmit it to the calculation unit 114, as shown by arrow 119.

The optical transmission system description is constructed thanks to the above described method for determining optical transmissions description as follows:

The system description defines a plurality of sections $S_k$ of the optical transmission system and, for each section $S_{k'}$ an input power $P_k$ of the system segment, a local dispersion value of the system segment $F_k$ and an input cumulative dispersion $D_k$ of the system section $S_k$.

The calculation unit 114 is configured to perform, for each system segment $S_k$ of the system description received from the input interface 118 the selection of a variance entry $\sigma_{match(k)match(k)}$ in the look-up table stored in the data repository 113, so that the local dispersion value $DF_k$ and input cumulative dispersion value $D_k$ of the system segment k substantially match the local dispersion value $DF_{match(k)}$ and input cumulative dispersion value $D_{match(k)}$ associated with the variance entry $\sigma_{match(k)match(k)}$.

For example, the input cumulative value $D_k$ substantially matches $D_{match(k)}$ if $$\frac{|D_{match(k)} - D_k|}{|D_k|} < \varepsilon,$$

wherein Σ=5%.

The calculation unit 114 is also configured to perform, for each couple of this system segments $S_k$ and $S_{k'}$ the selection of a covariance entry $\sigma_{match(k)match(k')}$ in the look-up table, so that the local dispersion value $DF_k$ and input cumulative dispersion value $D_k$ of the system segment $S_{k'}$ substantially match the first couple $S_k$ and $S_{k'}$ associated with the covariance entry of the look-up table $\sigma_{match(k)match(k')}$ and so that the local dispersion and input cumulative dispersion of the system segment $S_{k'}$ substantially match the second couple associated with the covariance entry.

The calculation unit 114 is also configured to perform the calculation of the $SNR_{NL}^{-1}$, that is a quality of transmission estimate, as follows:

$$SNR_{NL}^{-1} = \sum_{k=1}^{N} P_k^2 \sigma_{match(l)match(k)} + 2\sum_{k=1}^{N}\sum_{k'=1}^{k-1} P_k P_{k'} \operatorname{Re}[\sigma_{match(l)match(k')}]$$

The device is further configured for transmitting the calculated quality of transmission estimate $SNR^{-1}_{NL}$ through the output interface 115.

Turning back to the example of optical link ab which look-up table $\Sigma_1$ is represented on FIG. 2, the matching performed by the calculation unit 114 leads to a covariance matrix $\Sigma_1$ represented on FIG. 3 comprising all the selected variances and covariances corresponding to the characterizing couples $F_k$ and $D_k$ of the sections $S_k$ of the optical link comprising the two spans 123 and 456.

As the $F_k$ is the same for the two spans 123 and 456, and as no in-line dispersion is comprised on the optical link ab, the covariance matrix $\Sigma_1$ represented on FIG. 3 is constructed thanks to the look-up table $\Sigma_1$ represented on FIG. 2 by selecting the upper-left 3×3 sub-matrix $\sigma_{123}$ represented in a solid-line frame comprising the variance of the first span 123, the down-right 3×3 sub-matrix $\sigma_{456}$ represented in a dashed-line frame comprising the variance of the second span 456 and the other two 3×3 sub-matrices $\sigma_c$ and $\sigma_c$, respectively represented in a dotted-line frame and in a dash-dotted line frame comprising the covariance terms between the span 123 and the span 456. In this particular case, there is no overlap between the used sub-matrices of $\Sigma_1$, while all its elements are used. Indeed, in this particular example, match(k)=k for each k from 1 to 6.

In an embodiment, the look-up table is a covariance matrix which has been constructed by blocks. Indeed, for two covariance matrices X and Y, a joint covariance matrix $\Sigma_{X,Y}$ of X and Y may be written in the following block form:

$$\Sigma_{X,Y} = \begin{bmatrix} \Sigma_{XX} & \Sigma_{XY} \\ \Sigma_{YX} & \Sigma_{YY} \end{bmatrix}$$

where $\Sigma_{XX}$=var(X), $\Sigma_{YY}$=var(Y) and $\Sigma_{XY}=\Sigma_{YX}^T$=cov(X,Y).

For example, by using the method above described, a first covariance matrix has been constructed for a first fiber span 123 and a second covariance matrix has been constructed for a second fiber span 456. The look-up table comprises the covariance matrix $\Sigma_1$ calculated from the first covariance matrix $\sigma_{123}$ and second covariance matrice $\sigma_{456}$.

Similarly, for example, by using the method above described, a first covariance matrix may be constructed for a first local dispersion value and a second covariance matrix may be constructed for a second dispersion value. In that case, the look-up table comprises the covariance matrix calculated from the first and second covariance matrices. Therefore, with two types of fiber, the look-up table comprises an extended matrix having more rows and columns In a second illustrative example, represented on FIGS. 4 to 6, the same covariance matrix construction is performed from the pre-calculated look-up table $\Sigma_1$ for an optical link cd different from the optical link ab. Elements which are similar to those of FIGS. 1 to 3 are represented by the same numbers. Optical link cd has a partial dispersion compensation at the end of the first span 123, as represented on the position 13. In this example, the matching is performed by the device represented on FIG. 8, as shown by the above table.

| k | Match (k) |
|---|---|
| 1 | 1 |
| 2 | 2 |
| 3 | 3 |
| 4 | 2 |
| 5 | 3 |
| 6 | 4 |

Figure 6:
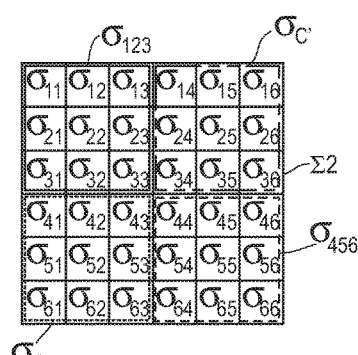
FIG. 6 is a covariance matrix of the nonlinear noise of the sections of the optical link of FIG. 4, the covariance matrix being constructed thanks to the look-up table of FIG. 2 by selecting the variances and covariances of the cumulative dispersion values corresponding to the successive sections of the optical link of FIG. 4.

Therefore, a fraction of the matrix $\Sigma_1$ is to be used to construct the matrix $\Sigma_2$ represented on FIG. 6. As shown on FIG. 5, the sub-matrices corresponding to the variance and covariance matching terms overlap.

The $SNR^{-1}{}_{NL}$ is then calculated as follows:

$$SNR_{NL}^{-1} = \sum_{k=1}^{N} P_k^2 \sigma_{match(l)match(k)} + 2\sum_{k=1}^{N}\sum_{k'=1}^{k-1} P_k P_{k'} \text{Re}[\sigma_{match(l)match(k')}]$$

Wherein $P_k$ denotes the input power of the section $S_k$.

In an embodiment, the power $P_k$ is calculated as follows:

$$P_k = P_1 e^{-\alpha(z_k - z_1)}$$

Wherein $P_1$ denotes the input power of the optical link AB, $\alpha$ denotes the absorption and $z_k$ the abscissa of the input of the section $S_k$.

The device is therefore able to provide an estimation of the quality of transmission $SNR_{NL}^{-1}$ for an optical system which is not yet estimated, for example cd, thanks to a look-up table constructed as described above, for the optical link ab.

For the sake of comparison, the numerical simulation by SSFM of a 9-channel Polarization Division Multiplexed Quaternary Phase Shift Keying PDM-QPSK signal over 100 km, requires about 15 minutes running on a server with a CPU at 2.67 GHz and 16 Gb of memory. This simulation duration makes SSFM simulations unsuitable for real-time applications. By contrast, the device above described allows performing the same calculation in much shorter time, e.g. less than a few seconds.

The above device is fast and accurate for estimating the performance of transmission of an optical link in an optical network. In a preferred embodiment, the section length is comprised between 100 m and 20 km.

Figure 10:
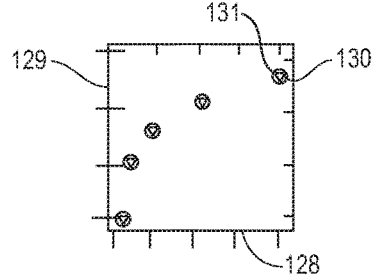
FIG. 10 is a graph showing the numerical simulation results of the variance over the section length calculated thanks to the method of FIG. 7, compared to the variance calculated thanks to a SSFM simulation.

Therefore, the above device is able to estimate the performance of optical links having a minimal length $L_s$ equal to the section length, i.e. between 100 m and 20 km. FIG. 10 is a graph showing the numerical simulation results of the variance over the section length calculated thanks to the method of FIG. 7, compared to the variance calculated with SSFM simulations. The vertical axis 129 represents the variance in dB for a range from −50 to −35 dB and the horizontal axis 128 represents the section length in km for a range from 0 to 20 km. The round markers 131 represents an example of the nonlinear distortion variance evolution for a Single Mode Fiber SMF span of a maximum length of 20 km and the triangle markers 130 represents the evolution of the nonlinear variance estimation considering the covariance matrix constructed thanks to the method above described. The cumulated dispersion of the span is fixed to 30000 ps/nm and the input power is Pin=0 dBm. An excellent accuracy is observed as the triangle markers match the round markers.

In the above embodiments, the Kerr effect has been presented as the main source of nonlinear impairments of the optical signals for the sake of simplicity. The optical Kerr effect can result in impairments on the optical signal for many reasons listed below: optical bistability, self-focusing effect, self-phase modulation, solitons formation and others.

Many other possible nonlinear effects from the list below may be taken into account: second order nonlinearities, second harmonic generation, frequency mixing, optical parametric amplification and oscillation, spontaneous parametric down conversion, sources of entangled photons based on SPDC, third order nonlinear effects as four-wave mixing, Raman scattering, spontaneous and stimulated Raman scattering, Raman amplification, Brillouin Scattering, two photons absorption and others.

The computation device described hereinabove may be implemented through the use of dedicated hardware as well as hardware capable of executing software in association with appropriate software. When provided by a processor, the corresponding functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, central processing unit (CPU), digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The computation device above described may be implemented in a unitary manner or in a distributed manner.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

The invention claimed is:

1. A method comprising the steps of:
    determining a dispersion map of an optical transmission system, wherein the dispersion map graphically displays a cumulative dispersion as a function of transmission distance along a path of the optical transmission system, and wherein a cumulative dispersion value is determined as a function of a local dispersion value of an optical fiber in at least a portion of the optical transmission system and a distance in which an optical signal has propagated through the at least the portion of the optical transmission system, and wherein the dispersion map displays a set of discrete cumulative dispersions on a vertical axis and the distance along a horizontal axis,
    defining a plurality of sequential system segments of the optical transmission system, wherein each system segment has an input point that corresponds to a point in the optical transmission system where an input cumulative dispersion graphically shown on the dispersion map matches a cumulative dispersion of the set of discrete cumulative dispersions graphically shown on the vertical axis,
    for each system segment, determining an input power of the system segment and a local dispersion value of the system segment,
    for each system segment, storing the input cumulative dispersion of the sequential system segments, storing a sequence number of the system segments, and storing the input power and the local dispersion value determined in relation with the input cumulative dispersion of the system segment in a data repository, and
    providing the stored values for use in determining a quality of transmission estimate for the optical system.

2. The method in accordance with claim 1, wherein the discrete cumulative dispersions of the set are separated by a fixed cumulative dispersion increment on the dispersion map, and wherein the fixed cumulative dispersion increment corresponds to a dispersion cumulated by an optical signal propagating along a section of an optical link.

3. The method in accordance with claim 1, further comprising:
    determining an upper bound and a lower bound of the dispersion map and selecting the set of discrete cumulative dispersions to make it cover more than 95% of the range between the upper bound and the lower bound, wherein a quantity bounded comprises the cumulative dispersion at the input of each segment in the optical transmission system.

4. The method in accordance with claim 1, wherein the set of discrete cumulative dispersions is comprised in a range of cumulative dispersion between $-10^{-4}$ ps/nm and $10^4$ ps/nm.

5. The method of claim 1 further comprising:
    providing a look-up table comprising a plurality of variance entries, each variance entry being stored in association with a corresponding local dispersion value and a corresponding cumulative dispersion value, the cumulative dispersion value being chosen in a set of cumulative dispersion values consisting of the sum of a predefined pre-compensation dispersion and a predefined dispersion increment multiplied by an integer number ranging from 0 to an upper bound greater than or equal to 0,
    the look-up table further comprising a plurality of covariance entries, each covariance entry being stored in association with a first couple comprising a local dispersion value and a cumulative dispersion value and a second couple comprising a local dispersion value and a cumulative dispersion value,
    for each system segment of the optical transmission system, selecting a variance entry in the look-up table, so that the local dispersion and the input cumulative dispersion of the system segment substantially match the local dispersion value and cumulative dispersion value associated with the variance entry,
    for each couple of the system segments, selecting a covariance entry in the look-up table, so that the local dispersion and the input cumulative dispersion of the system segment substantially match the first couple associated with the covariance entry and so that the local dispersion and the input cumulative dispersion of the system segment, substantially match the second couple associated with the covariance entry, and
    calculating the quality of transmission estimate as:

$$SNR_{NL}^{-1} = \sum_{k=1}^{N} P_k^2 \sigma_{match(l)match(k)} + 2 \sum_{k=1}^{N} \sum_{k'=1}^{k-1} P_k P_{k'} \mathrm{Re}[\sigma_{match(l)match(k')}]$$

where N is the number of system segments in the optical transmission system description.

* * * * *